United States Patent Office 3,475,603
Patented Oct. 28, 1969

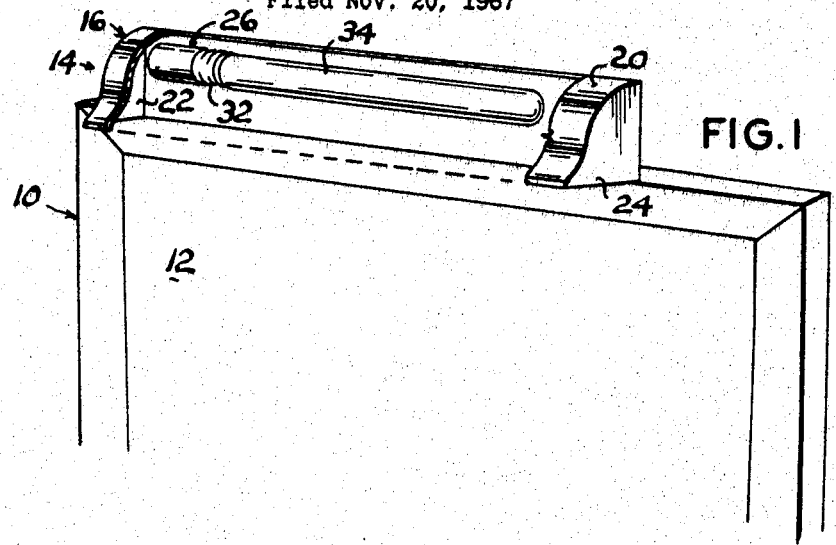
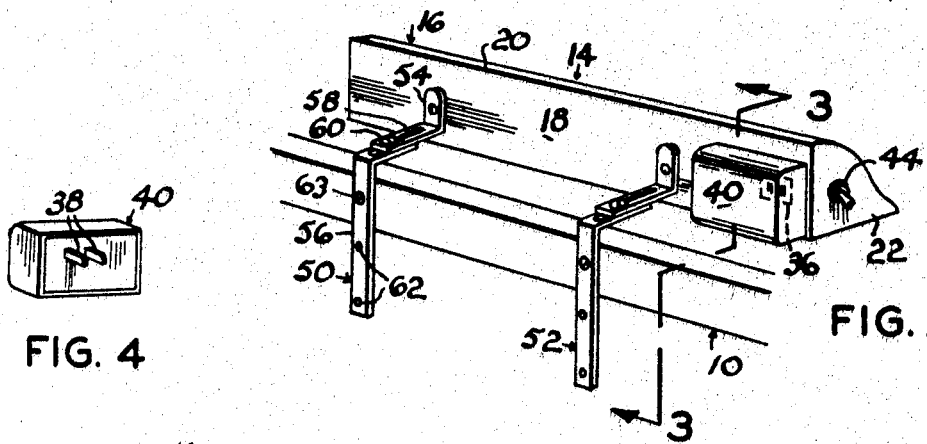
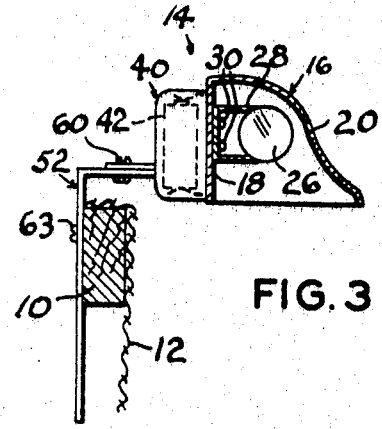
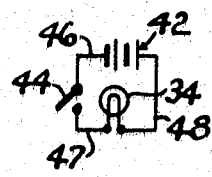

3,475,603
RECHARGEABLE BATTERY OPERATED
PICTURE ILLUMINATING LAMP
Roger A. Gheno, San Mateo, Calif.
(P.O. Box 31128, Aurora, Colo. 80010)
Filed Nov. 20, 1967, Ser. No. 684,307
Int. Cl. F21v 33/00; F21l 3/00
U.S. Cl. 240—2                                    1 Claim

ABSTRACT OF THE DISCLOSURE

An elongated lamp shade is horizontally connected to the upper back portion of the frame of a picture to be illuminated by vertically and horizontally adjustable brackets. The lamp shade contains a socket which receives an elongated lamp. The filament of the lamp is excited by a rechargeable battery pack removably connected to the lamp socket through the back of the shade.

BACKGROUND OF THE INVENTION

The present invention relates to picture displaying means and more particularly to a cordless picture illuminating lamp.

To enhance the appearance of framed pictures when hung on a wall it is desirable to provide a means for illuminating the picture particularly in areas where the room or natural lighting is dim. Picture lighting devices have heretofore been provided but usually require that the picture be positioned near an electrical service outlet so that the lighting device may be connected therewith. To accomplish this it is sometimes necessary to use extension cords which are unsightly and detract from the decor. This invention eliminates the necessity of such wiring for connection with an electrical outlet by providing a battery powered picture illuminating lamp. Most battery powered devices have the objection that the batteries soon become discharged and must be frequently replaced. This objection is overcome in this invention by providing a means for connecting and operating the device with a recharge able battery pack.

SUMMARY OF THE INVENTION

An elongated shade comprising a housing formed by a flat vertical rearward wall and an adjoining arcuate forward and downwardly extending wall defines a downwardly open bottom. The shade is mounted horizontally parallel with and above the frame of a picture to be illuminated by a pair of bracket means extending between the picture frame and the vertical back wall surface of the housing. The housing contains, at one end portion, a lamp socket which receives an elongated incandescent lamp. The lamp socket is provided with an electrical socket connected with the back wall of the housing for receiving the prongs forming an electrical plug of a rechargeable battery pack. The rechargeable battery pack is maintained operative for illuminating the lamp by periodic removal of the battery pack from the lighting device, as for example, during night time or other hours when the picture is not to be illuminated and plugging the rechargeable battery pack into an electrical service outlet.

The principal object of the invention is to provide a cordless picture illuminating device operated by a rechargeable battery pack.

BRIEF DESCRIPTION OF THE DRAWINGS

FIGURE 1 is a perspective view with parts broken away for clarity;

FIGURE 2 is a perspective view of the opposite side of the device shown in FIG. 1;

FIGURE 3 is a vertical cross-sectional view taken substantially along the line 3—3 of FIG. 2;

FIGURE 4 is a perspective view of the rechargeable battery pack, per se; and,

FIGURE 5 is a wiring diagram.

DESCRIPTION OF THE PREFERRED EMBODIMENT

Like characters of reference designate like parts in those figures of the drawings in which they occur.

In the drawings:

The reference numeral 10 indicates a portion of a rectangular frame enclosing a picture area 12 to be illuminated.

The reference numeral 14 indicates the picture lighting device comprising an elongated downwardly open lamp shade or hollow frame 16 substantially right triangular when viewed in transverse section. The frame 16 comprises a vertical back wall 18 and an arcuately curved shield or lamp shade wall 20 forming the hypotenuse portion of the right triangular shape. The inner surface of the wall 20 is preferably provided with a light reflective coating, not shown, for directing light rays downwardly as hereinafter described. End members 22 and 24 close the respective ends of the frame.

A lamp socket 26, attached to a bracket 28, is secured by the latter to the inner surface of the frame wall 18 adjacent one of its ends as by screws or rivets 30. The lamp socket has a roll threaded portion 32 which removably receives an elongated lamp or incandescent bulb 34. The frame 20 is provided with an electrical socket 36 (FIG. 2) cooperatively aligned with suitable apertures formed in the back wall 18. The socket 36 cooperatively receives a pair of conventional electrical conducting prongs 38 projecting outwardly of a substantially rectangular housing 40 comprising a rechargeable battery pack, such as disclosed by the patent to Moore et al. No. 3,220,888, containing conventional dry cell batteries 42 and battery recharging components, not shown. A toggle-type switch 44 is secured to the end wall 22 through a suitable aperture and connects the battery 42 to the lamp 34 by wires 46, 47 and 48, (FIG. 5). The device 14 is mounted on the picture frame 10 by bracket means 50 and 52. Since the brackets 50 and 52 are identical, only the bracket 50 will be described in detail for brevity.

The bracket 50 includes a pair of right angular-shaped strap metal members 54 and 56. One leg of the member 54 is vertically connected to the rearward surface of the frame wall 18 so that its other leg projects horizontally rearward of the frame 16 preferably in a plane spaced above the horizontal plane formed by the lowermost portion of the shade or frame 16. Similarly one leg of the member 56 is vertically connected to the rearward surface of the picture frame 10 with its other leg projecting horizontally forward of the upper limit of the picture frame. The cooperating horizontally disposed leg portions of each member 54 and 56 are each provided with a longitudinally extending slot or aperture 58 for adjustably positioning the device 14 horizontally forward of the vertical plane formed by the picture frame 10 by a screw or bolt 60 projecting through the aligned slots 58. Similarly the depending leg of the member 56 may be provided with an elongated slot, not shown, or a plurality of longitudinally spaced apertures 62 for receiving a screw 63 and adjustably connecting the bracket leg 56 to the picture frame 10 vertically with respect to the horizontal plane formed by the upper limit of the picture frame 10.

OPERATION

In operation the device 14 is connected to the picture frame 10 in the manner described hereinabove wherein the position of the device 14 is predetermined, according to the size of the picture 12 to be illuminated, so that the brackets 50 and 52 may be adjusted vertically or horizontally forward of the picture area to provide the best illumination from the lamp 34. The battery pack 40 is plugged into the socket 36 and the switch 44 is closed. The battery 42 is maintained operative for exciting the lamp by periodically removing the battery pack 40 and plugging it into a conventional household electrical outlet or socket, not shown, for example, this may be done during night time hours or at other periods when the picture is not to be illuminated.

Obviously the invention is susceptible to some change or alteration without defeating its practicability, and I therefore do not wish to be confined to the preferred embodiment shown in the drawings and described herein.

I claim:

1. An illuminating device for a picture having a frame, comprising: an elongated hollow housing forming a lamp shade, said lamp shade having a vertically disposed rearward wall and an arcuate forwardly and downwardly extending wall joined to the upper limit of said rearward wall; a lamp holder within said housing, said lamp holder having an electrical prong receiving socket; a lamp within said lamp holder; a rechargeable battery pack having outstanding electrical conducting prongs engaged with said electrical prong receiving socket; and bracket means vertically and horizontally adjustably connecting said lamp shade to the upper limit of said frame, said bracket means comprising two pairs of strap metal brackets, each pair of brackets comprising two right angular members having one leg of each member vertically disposed and connected, respectively, with the rearward wall of said lamp shade and the rearward surface of said picture frame, the other leg of each said member projecting horizontally rearwardly of said lamp shade and forwardly of said picture frame, respectively, in overlapping relation, the overlapping end portions of each said member having a longitudinally extending slot, and bolt extending through the slots in said overlapping end portions.

References Cited

UNITED STATES PATENTS

| 3,307,026 | 2/1967 | Kramer | 240—4 |
| 3,393,312 | 7/1968 | Dahl | 240—52.5 |

NORTON ANSHER, Primary Examiner

R. M. SHEER, Assistant Examiner

U.S. Cl. X.R.

240—10.6, 52.1